United States Patent [19]

Shimamura

[11] Patent Number: 4,719,473

[45] Date of Patent: Jan. 12, 1988

[54] RECORDING APPARATUS

[75] Inventor: Yoshiyuki Shimamura, Yokohama, Japan

[73] Assignee: Canon Kabushiki Kaisha, Tokyo, Japan

[21] Appl. No.: 51,258

[22] Filed: May 13, 1987

Related U.S. Application Data

[63] Continuation of Ser. No. 823,738, Jan. 29, 1986, abandoned.

[30] Foreign Application Priority Data

Feb. 8, 1985 [JP] Japan .................................. 60-21937
Feb. 8, 1985 [JP] Japan .................................. 60-21938

[51] Int. Cl.4 ............................................ G01D 15/10
[52] U.S. Cl. ................................ 346/76 PH; 400/120
[58] Field of Search ................. 219/216 PH; 400/120; 250/318; 346/76 PH

[56] References Cited

U.S. PATENT DOCUMENTS

| | | | |
|---|---|---|---|
| 3,114,902 | 12/1963 | Tanguy | 340/259 |
| 4,113,341 | 9/1978 | Minona | 346/76 PH |

FOREIGN PATENT DOCUMENTS

| | | |
|---|---|---|
| 51-3222 | 2/1976 | Japan . |
| 57-57679 | 4/1982 | Japan . |
| 58-185277 | 10/1983 | Japan . |

*Primary Examiner*—Arthur G. Evans
*Attorney, Agent, or Firm*—Fitzpatrick, Cella, Harper & Scinto

[57] ABSTRACT

A recording apparatus performs image recording on a recording medium such as recording paper by using a recording head. The recording apparatus include apparatus for determining the drive power of a recording head in response to an input from a manual operation device, a device for generating as a time output an input from the operation device, and a control device for measuring an output from the time output device and determining the drive time of the recording head which is suitable for the drive power voltage corresponding to the operation of the operation device.

6 Claims, 8 Drawing Figures

CORRECTION TABLE (15)

| | |
|---|---|
| 1 | $t_1$ |
| 2 | $t_2$ |
| 3 | $t_3$ |
| 4 | $t_4$ |
| 5 | $t_5$ |
| 6 | $t_6$ |

RECORDING APPARATUS

This application is a continuation of application Ser. No. 823,738 filed Jan. 29, 1986, now abandoned.

BACKGROUND OF THE INVENTION

1. Field of the Invention

The present invention relates to a recording apparatus such as a thermal printer, an electronic typewriter, a facsimile system, or an ink-jet printer and, more particularly, to a recording apparatus for recording an image such as characters and figures on a recording sheet by driving a recording head with heating elements.

2. Description of the Prior Art

A conventional recording apparatus of this type has a density volume control for controlling the recording density at an optimal or desired level. A voltage applied to the recording head is varied in accordance with different volume control positions, and the energization time is fixed.

The energization time of the recording head, however, is determined in accordance with an optimal density range. When the density volume control is adjusted to obtain a density falling outside this range, a high-quality image at the desired high or low density is often unattainable. Furthermore, thermal characteristics of the recording head in the conventional recording apparatus inevitably influence recording quality, and the recording density varies in accordance with ambient temperature, as is well known to those skilled in the art. In the conventional apparatus, a temperature sensor such as a thermistor is used to determine a time constant of a monostable multivibrator. The recording head is driven for an output time of the multivibrator operated corresponding to changes in ambient temperature.

The ambient temperature-recording density characteristics, however, do not coincide with the detection characteristics of the temperature sensor over the entire range of operation. Although a density difference caused by an ambient temperature can be compensated for to some extent, correction cannot be properly performed in a given temperature range. As a result, a uniform density cannot be obtained throughout the entire temperature range.

SUMMARY OF THE INVENTION

It is an object of the present invention to provide a recording apparatus for recording a high-quality image.

It is another object of the present invention to provide a recording apparatus for recording an image of a desired density.

It is still another object of the present invention to provide a recording apparatus for recording a high-quality image of a desired density irrespective of a preset position of a density control operation means.

It is still another object of the present invention to provide a recording apparatus for recording an image of a predetermined density without being influenced by the ambient temperature.

DESCRIPTION OF THE PREFERRED EMBODIMENTS

The present invention will be described in detail with reference to preferred embodiments in conjunction with the accompanying drawings.

Figure 1:
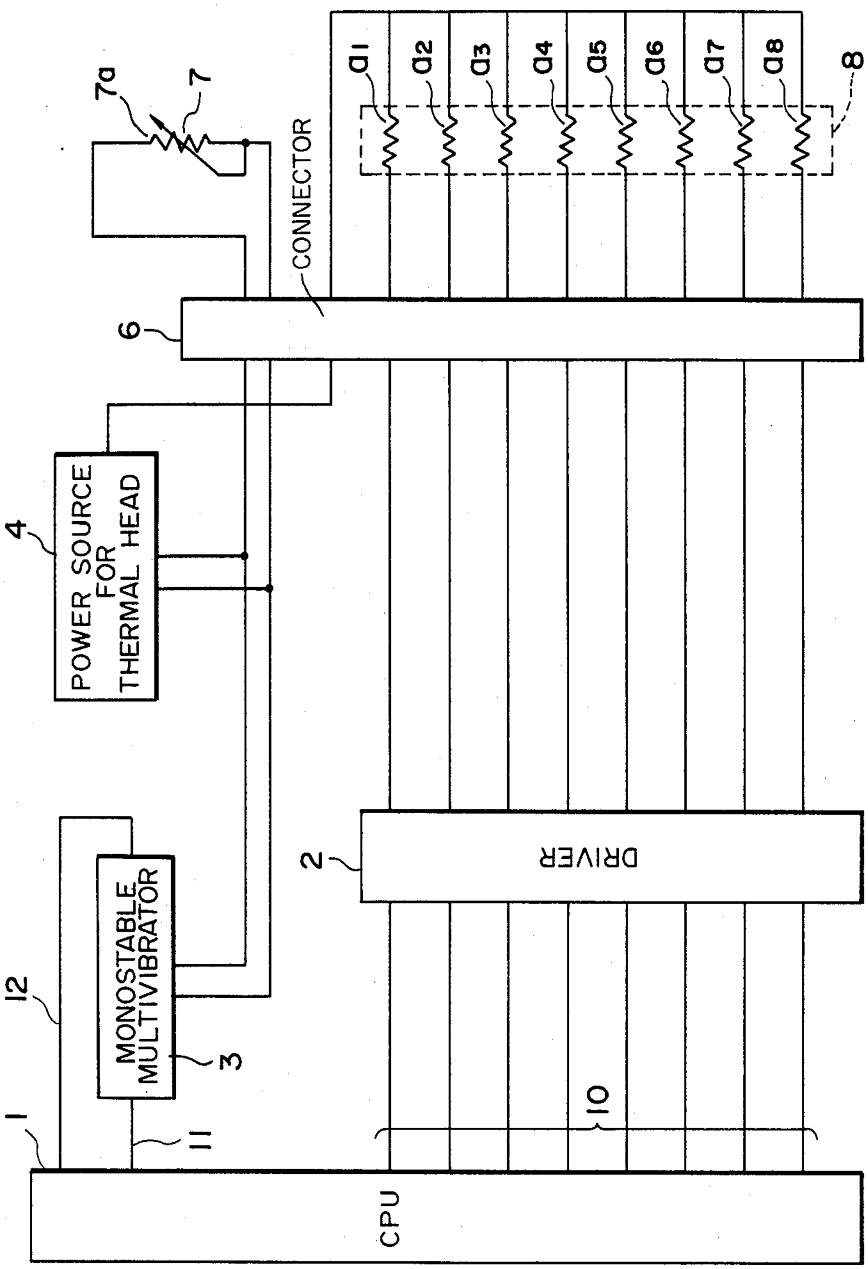
FIG. 1 is a control block diagram of a thermal printer according to an embodiment of the present invention.
Figure 2:
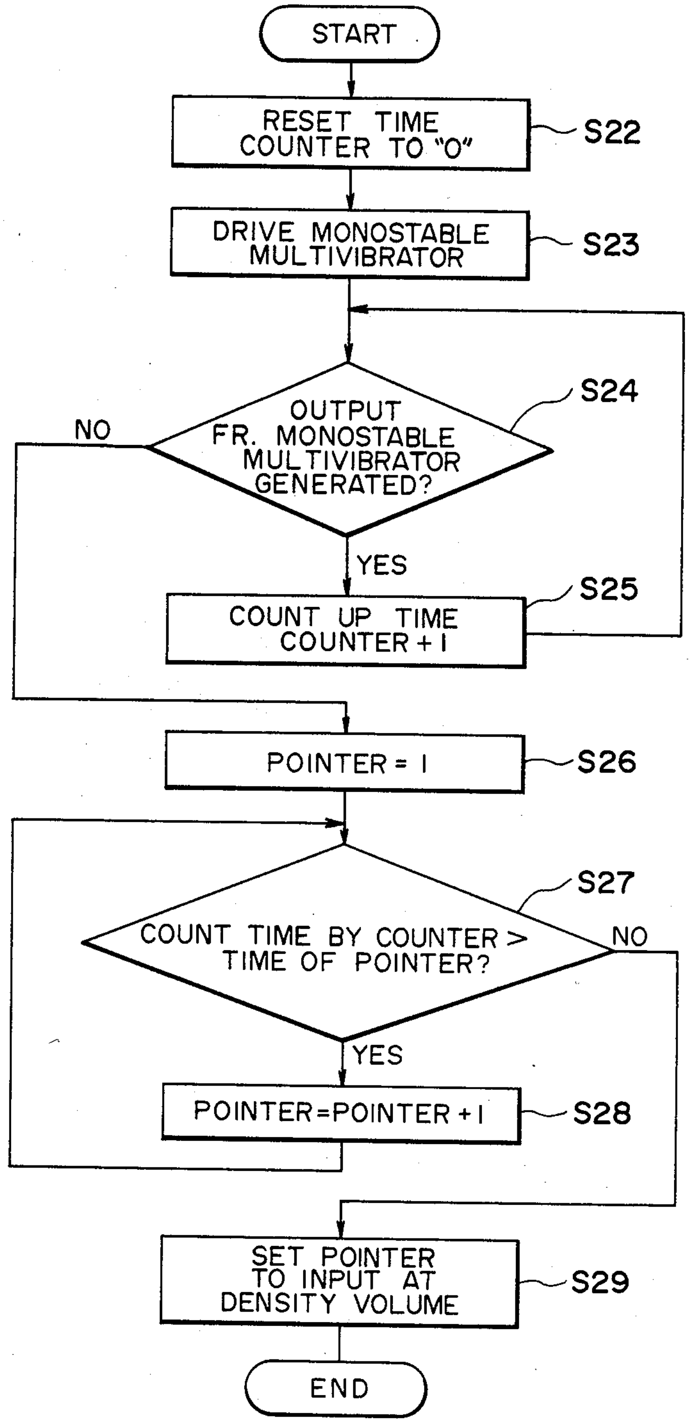
FIG. 2 is a flow chart for explaining an input detection routine of a CPU shown in FIG. 1.
Figures 3, 4:
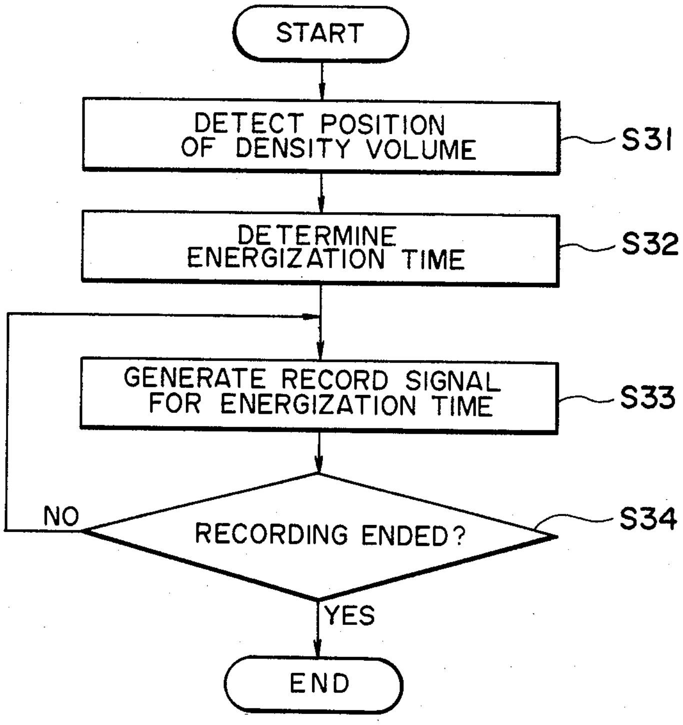
FIG. 3 is a flow chart for explaining recording energization control of the CPU shown in FIG. 1.
FIG. 4 is a conversion table.

FIG. 1 is a control block diagram of a thermal printer according to an embodiment of the present invention; FIG. 2 is a flow chart for explaining an input detection routine of a CPU shown in FIG. 1; FIG. 3 is a flow chart for explaining recording energization control of the CPU shown in FIG. 1; and FIG. 4 is a conversion table.

More particularly, FIG. 1 is a block diagram of a thermal printer having a recording head 8 with eight dot heaters al to a8.

Referring to FIG. 1, a CPU (Central Processing Unit) 1 consists of, for example, a one-chip microcomputer and controls the overall recording operations. The CPU 1 supplies a record signal to a driver 2 through signal lines 10 in accordance with a character to be recorded.

The driver 2 is a one-chip IC consisting of latch elements and switching elements (e.g., transistors). The driver 2 converts a logic signal from the CPU. 1 to a power signal having current and voltage levels sufficient to drive the thermal head 8. An output from the driver 2 is connected to the thermal head 8 through a connector 6 arranged near the thermal head 8.

The thermal head 8 consists of the eight dot heating resistors al to a8. The complementary terminals of the heating resistors al to a8 which are opposite the respective terminals connected to the driver 2 are commonly connected to a power source 4 for the thermal head throough one of the terminals of the connector 6.

The power source 4 supplies a record current to desired heating resistors al to a8 in the thermal head 8 to which the record signal is supplied. A voltage applied from the power source 4 to the thermal head 8 is controlled by a density volume control 7 consisting of, for example, a variable resistor *7a* in a same manner as in the conventional recording apparatus. The density volume control 7 determines the time constant of a monostable multivibrator 3, so that an operator can operate the density volume control 7 to set the density of an image to a desired value.

The monostable multivibrator 3 is a TTL or CMOS triggerable monostable multivibrator IC chip. The monostable multivibrator 3 is enabled in response to a pulse from the CPU 1 through a signal line 11 and generates a pulse with a width corresponding to a time constant determined by the density volume control 7 and a capacitor (not shown). An output from the monostable multivibrator 3 is obtained by the CPU 1 through a signal line 12. The CPU 1 counts the pulse width.

The operation of the recording apparatus having the arrangement described above will be described in detail.

In the above embodiment, the signal from the density volume control 7 adjusted by the operator to a position corresponding to a desired density of the image is detected by the CPU 1. The CPU 1 determines the proper energization time of the thermal head 8 which corresponds to its proper drive voltage.

FIG. 2 is a flow chart for explaining a temperature detection program of the CPU 1.

In step S22 of FIG. 2, a software time counter is reset by software.

In step S23, a pulse is supplied to signal line 11 to start the monostable multivibrator 3. The monostable multivibrator 3 generates a pulse with a width determined by the set position of the density volume control 7.

In a loop of steps S24 and S25, the time counter continues counting up until the output from the monostable multivibrator 3 is disabled ((step S24).

When the CPU 1 determines in step S24 that the output from the multivibrator 3 is disabled, the flow advances to step S26. Since the density volume control 7 is connected as a time-constant element for the monostable multivibrator 3, an input from the density volume control 7 is held as the output time of the monostable multivibrator 3 by the time counter. Therefore, the CPU 1 checks the input from the density volume control 7 in reference to the output time of the monostable multivibrator 3.

A correction table 15 is stored in a ROM arranged together with the CPU 1. The correction table 15 represents the relationship between the output time of the monostable multivibrator 3 and the input at the density volume control 7, as shown in FIG. 4. This relationship corresponds to the preset-resistance characteristics of the density volume control 7. Referring to FIG. 4, numbers 1 to 6 represent pointers (the density volume control positions), and reference numerals t1 to t6 denote times corresponding to the pointers 1 to 6. In step 26, the pointer in the table 15 for storing the time corresponding to the position of the density volume control 7 is set to 1. In step S27, the CPU 1 compares the time counter with the time represented by the pointer. When the CPU 1 determines that the count of the time counter is larger than the time-count represented by the pointer, the flow advances to step S28. The count of the pointer is incremented by one in step S28, and the flow returns to step S27. The incremental operation is repeated until the count of the time counter is smaller than the time-count represented by the pointer. When the count of the time counter is smaller than the time-count represented by the pointer, the flow advances to step S29. In the embodiment, this pointer is regarded as the input from the density volume control 7.

The CPU 1 detects the input from the density volume control 7 in the manner as described above.

Energization control for the thermal head 8 in response to the detected input of the density volume control 7 will be described with reference to FIG. 3. FIG. 3 is a flow chart showing part of a recording control program executed by the CPU 1.

Step S31 in FIG. 3 shows an input detection routine described with reference to FIG. 2.

When the input detection routine for detecting the position of the density volume control 7 in step S31 is completed, the flow advances to step S32. In step S32, an energization time of the thermal head 8 is determined in accordance with the input detected in step S31. The voltage and the corresponding energization time are prestored in a table in the TOM in the CPU 1. When the table is accessed in response to the detected position of the density volume control 7, an optimal energization time cn be determined.

In step S33, a record signal representing characters and figures is applied through signal lines 10 to the driver 2 to drive the thermal head 8 for the energization time determined in step S32. In this case, the voltage applied to the thermal head 8 is determined by the density volume control 7. The energization time is controlled to be an optimal value corresponding to the applied voltage by processing in step S32.

The heating resistors in the thermal head 8 are thus energized by the applied record signal for an optimal period of time.

In step S34, the CPU 1 checks the contents of the record data buffer to determine whether all data has been recorded. If NO in step S34, the flow returns to step S33, and recording is continued.

The input from the density volume control 7 is accurately detected and the optimal energization time of the thermal head is determined by software in accordance with the voltage-energization time characteristics. Unlike the conventional recording apparatus, the quality of the image at a high or low density is not degraded, thus allowing recording of images of uniform quality throughout the entire density range.

According to this embodiment, the recording apparatus can be implemented by adding only the monostable multivibrator 3 for detecting the position of the density volume control to the conventional recording apparatus. A simple recording apparatus can therefor be manufactured at low cost without increasing the number of constituting components.

In the above embodiment, a single energization time is used throughout one recording operation. However, the energization time for the thermal head 8 can be determined in units of lines or predetermined periods of recording time. The above embodiment exemplifies the case wherein the drive voltage of the thermal head 8 is determined by the density volume control. However, the drive time can be determined by a drive current in a drive current control system.

Another embodiment will be described wherein a control means is provided for determining the drive time of a recording head in accordance with ambient temperature.

This embodiment will be described in detail with reference to the accompanying drawings.

Figure 5:
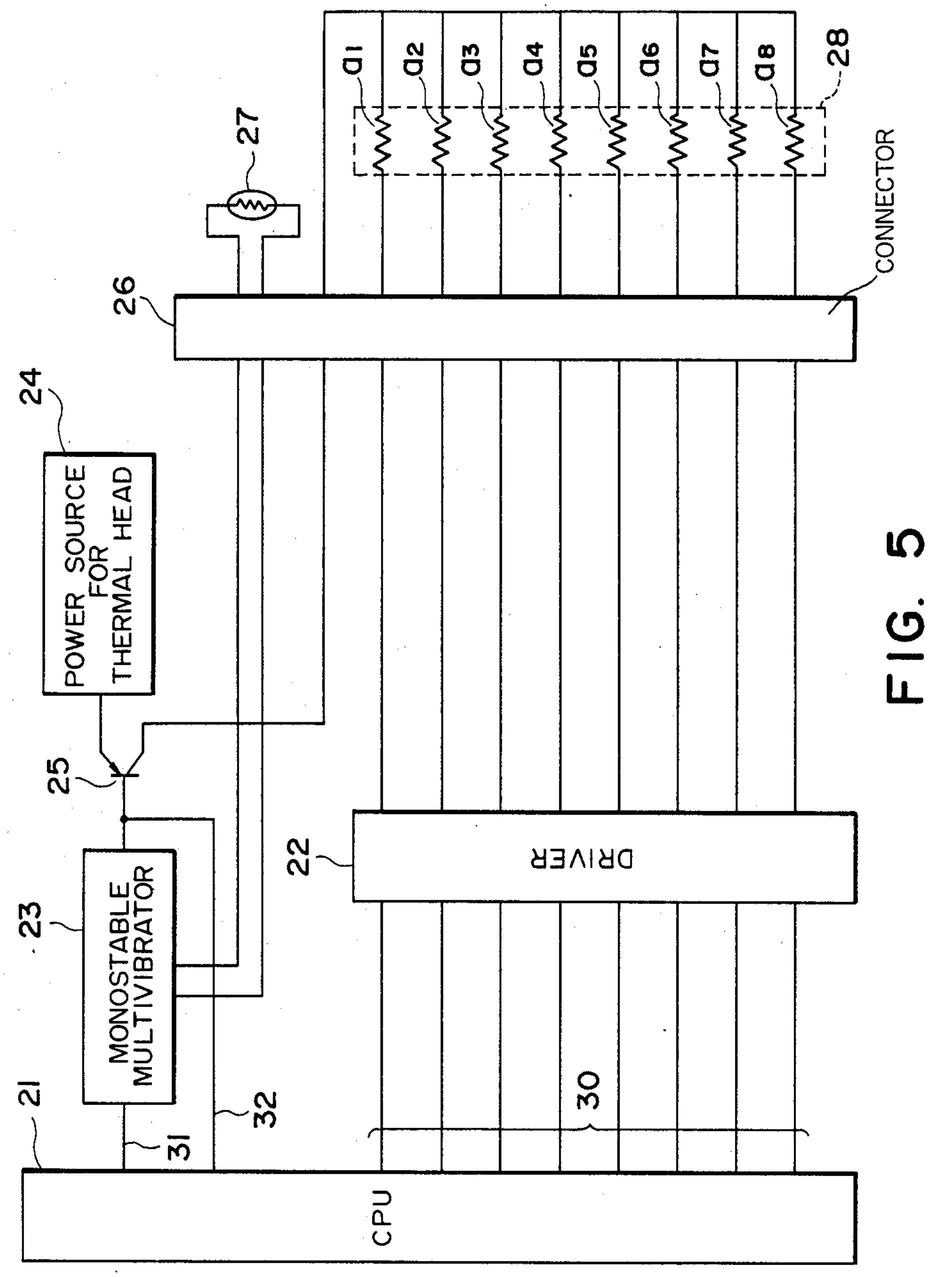
FIG. 5 is a control block diagram of a thermal printer according to another embodiment of the present invention.

FIG. 5 shows a recording apparatus according to this embodiment, exemplified by a thermal printer having a recording head 28 with eight dot heating resistors al to a8.

Referring to FIG. 5, a CPU (Central Processing Unit) 21 is a one-chip microcomputer and controls the overall recording operation. The CPU 21 supplies a record signal to a driver 22 through signal lines 30 in accordance with a character to be recorded.

The driver 22 is a one-chip IC consisting of latch elements and switcing elements (e.g., transistors). The driver 22 converts a logic signal from the CPU 21 to a power signal with current and voltage levels sufficient to drive the thermal head 28. An output from the driver 22 is connected to the thermal head 28 through a connector 26 arranged near the thermal head 28.

The thermal head 28 consists of the eight dot heating resistors al to a8. The complementary terminals of the heating resistors al to a8, opposite the terminals connected to the driver 22, are commonly connected to the collector of a switching transistor 25 through one of the terminals of the connector 26.

The transistor 25 causes a power source 24, in accordance with the record signal, to supply power to the heating resistors al to a8 in the thermal head 28 for a predetermined period of time. The emitter of the transistor 25 is connected to the output terminal of the monostable multivibrator 23.

The monostable multivibrator 23 is a TTL or CMOS triggerable monostable multivibrator IC. The monostable multivibrator 23 receives a pulse from the CPU 21 through a signal line 31 and is thereby set or reset. The monostable multivibrator 23 generates a pulse with a width corresponding to a time constant determined by a temperature sensor 27 and a capacitor (not shown) upon operation of the CPU 21. The output from the monostable multivibrator 23 is supplied to the transistor 25 and to the CPU 21 through a signal line 32. The CPU 21 then counts the pulse width.

The temperature sensor 27 consists of a temperature sensor element such as a thermister and is arranged near the thermal head 28. The resistance of the temperature sensor 27 is changed in accordance with a change in ambient temperature. The temperature sensor 27 is connected to the monostable multivibrator 23 through the connector 26.

The operation of the recording apparatus having the arrangement described above will be described hereinafter.

In this embodiment, the CPU 21 detects the ambient temperature and performs correction in accordance with the detected temperature, thereby determining a recording energization time of the thermal head 28.

Figure 6:
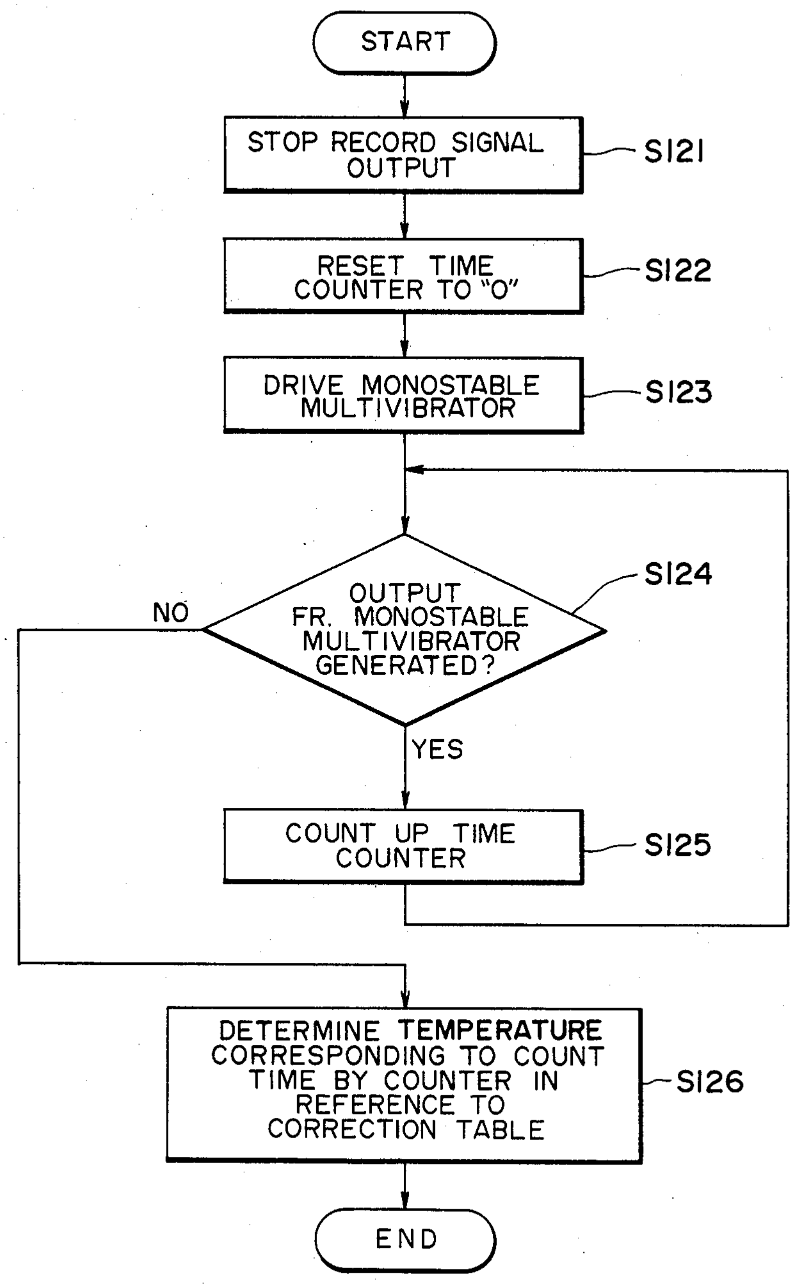
FIG. 6 is a flow chart for explaining a temperature detection routine of a CPU shown in FIG. 5.

FIG. 6 is a flow chart for explaining a temperature detection program of the CPU 21.

In step 121, a record signal on signal lines 30 is disabled by the CPU 21 so as not to heat the thermal head 28, so that the thermal head 28 is turned off.

In step S 122, the software time counter is reset by software.

In step S 123, a pulse is sent through signal line 31 to start the monostable multivibrator 23. The monostable multivibrator 23 generates a pulse with a width corresponding to the time constant of the temperature sensor 27, the resistance of which is changed in accordance with a change in ambient temperature.

In a loop of steps S 124 and S 125, the time counter continues counting up until the output from the monostable multivibrator 23 is disabled (step S 124).

When the CPU 21 determines in step S 124 that the output from the multivibrator 23 is disabled, the flow advances to step S 126. Since the temperature sensor 27 is connected as a time-constant element for the monostable multivibrator 23, the input from the temperature sensor 27 is held as an output time for the monostable multivibrator 23 by the time counter. Therefore, the CPU 21 checks the ambient temperature near the thermal head 28 with reference to the output time of the monostable multivibrator 23.

A correction table is stored in a ROM arranged together with the CPU 21. The correction table represents the relationship between the temperature and the output time of the monostable multivibrator 23. The relationship corresponds to the temperature-resistance characteristics of the temperature sensor 27.

The CPU 21 detects the ambient temperature near the thermal head 28.

Figure 7:
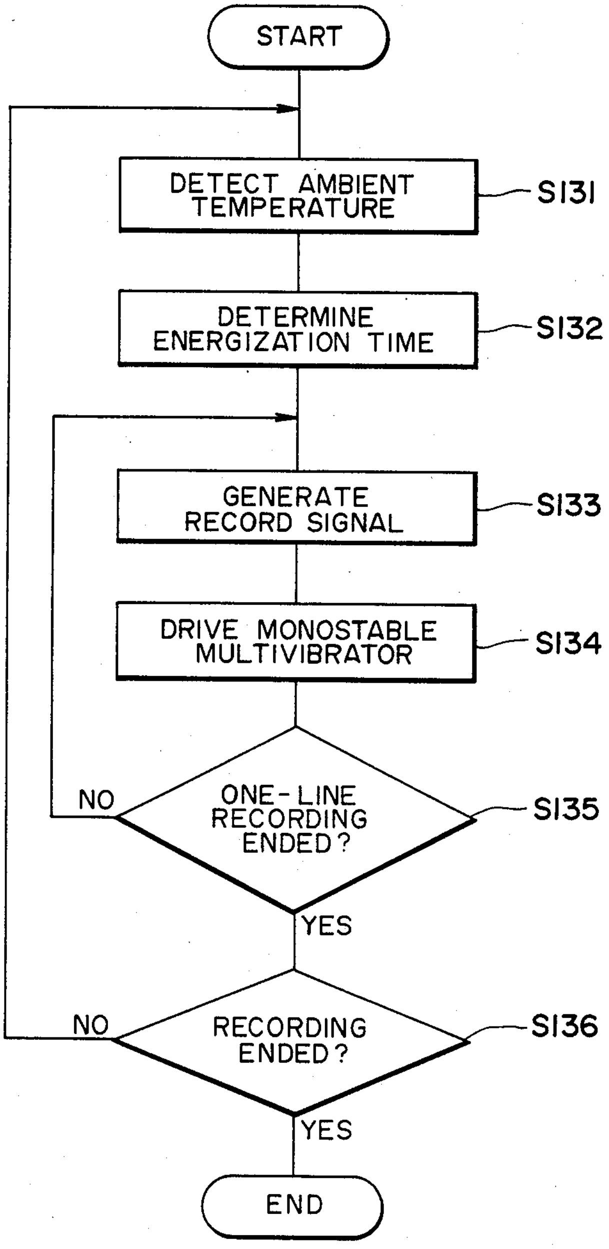
FIG. 7 is a flow chart for explaining recording energization control of the CPU shown in FIG. 5.

Energization control of the thermal head 28 with reference to the detected ambient temperature will be described with reference to FIG. 7. FIG. 7 is a flow chart showing part of a recording control program of the CPU 21.

Step S 131 in FIG. 7 shows the temperature detection routine shown in FIG. 6.

When the temperature detection routine in step S 131 is completed, the flow advances to step S 132 to determine the energization time of the thermal head 28. If the output time of the monostable multivibrator 23 which corresponds to the resistance of the temperature sensor 27 is used as the energization time of the thermal head 28 in the same manner as in a conventional recording apparatus, a density difference occurs in different temperature regions since the temperature-density characteristics of the thermal head 28 are slightly different from the temperature detection characteristics of the temperature sensor 27.

In this embodiment, the energization time of the thermal head 28 is determined in accordance with the temperature detected in step S 131. More particularly, in step S 132, the conversion table prepared on the basis of the temperature-density characteristics of the thermal head 28 is accessed in order to obtain the optimal density corresponding to the temperature detected in step S 131 and hence an optimal energization time corresponding to the optimal density is determined.

Subsequently, in step S 133, a record signal representing characters and figures to be recorded is supplied to the driver 22 through the signal lines 30. In step S 134, the monostable multivibrator 23 is driven. In this case, the monostable multivibrator 23 is directly set/reset in response to a signal via the signal line 31 for the optimal energization time calculated in step S 132.

Desired heating resistors al to a8 in the thermal head 28 are energized through the transistor 25 for the optimal period of time.

The CPU 21 checks in step S 135 whether or not one-line recording is completed. If NO in step S 135, steps S 133 and S 134 are repeated to perform recording for the same energization time.

However, if YES in step S 135, the CPU 21 checks the contents of the recording data buffer in step S 136 to check whether all record data has been recorded. If NO in step S 136, the flow returns to step S 131 to determine a given energization time in accordance with a new temperature, and the thermal head 28 is operated for the given energization time to continue recording.

According to this embodiment, the ambient temperature is accurately detected for each one-line recording cycle in accordance with the detection characteristics of the sensor, and an optimal energization time is selected by software in accordance with the temperature-density characteristics of the thermal head. Unlike in the conventional recording apparatus, the apparatus of this embodiment is free from recording density error caused by the particular detection characteristics of the temperature sensor and can record at an optical density throughout the entire temperature range.

According to this embodiment, temperature detection and energization time control can be performed by a single monostable multivibrator. The recording apparatus can be manufactured at a relatively low cost without increasing the number of constituting components.

In the above embodiment, the energization time is determined for each one-line recording cycle. However, the energization time of the thermal head can be determined for each one-page recording cycle or upon temperature detection after recording is performed for a predetermined period of time.

Figure 8:
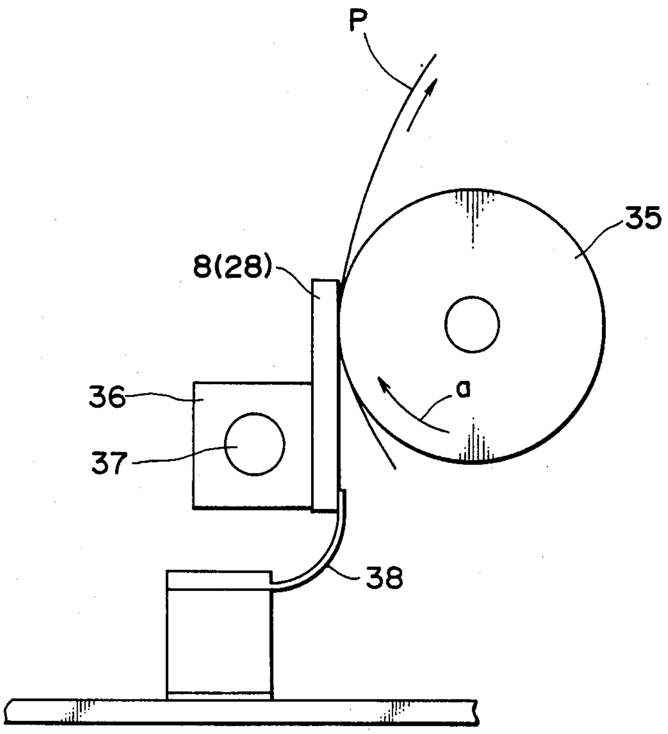
FIG. 8 is a side view of the thermal printer schematically shown in FIG. 1 or 5.

FIG. 8 is a side view of the thermal printer schematically shown in FIG. 1 or 5.

Referring to FIG. 8, a carrier 36 carries the thermal head 8 (28) and can reciprocate along a guide shaft 37 parallel to a platen roller 35. Flexible wires 38 are connected to the control means located at the fixed side of the thermal printer. The CPU 1 (21) or the like is arranged in the control means. When the control operation described above is performed, the thermal head 8 (28) sequentially records an image such as characters, numerals and figures on a recording medium P (recording paper, an OHP sheet or the like) fed along a direction indicated by arrow the, i.e., a direction of rotation of the platen roller.

The present invention can be applied to a system wherein a heat-sensitive sheet is colored by the recording head with heating resistors or a thermal transfer system wherein inks in an ink ribbon are melted and the melted inks are transferred to normal paper. The present invention can also be applied to a so-called line system, wherein the recording head is arranged within the overall width of the recording region, or a so-called serial system, wherein the recording head is reciprocated as described above.

As described above, the present invention provides a recording apparatus for recording an image with a desired density.

What is claimed is:

1. A recording apparatus for recording an image on a recording medium, comprising:

a recording head for recording on the recording medium at a density determined by the width and voltage level of a print pulse applied to said recording head;

manual operation means for manually setting the voltage level of the print pulse to provide a desired density of the recorded image;

output means, responsive to said manual operation means, for generating an output signal representing the voltage level set by said manual operation means; and control means, responsive to the output signal from said output means, for setting the width of the print pulse to effect recording at the desired density provided by said manual operation means.

2. A thermal printer for recording an image by heat on a recording medium, comprising:

a thermal head having heating elements for recording on the recording medium at a density determined by the width and voltage level of a print pulse applied to said thermal head;

density varying means for changing the voltage level fo the print pulse applied to said thermal head to provide a desired density of the recorded image;

detecting means, including a monostable multivibrator having a time constant determined by the voltage level of the print pulse, for detecting the voltage level of the print pulse; and control means for recognizing changes in the time constant of said multivibrator to detect the voltage level of the print pulse and for setting the width of the print pulse in accordance with the detected voltage level in order to effect recording at the desired density provided by said density varying means.

3. A recording apparatus according to claim 1, wherein the output signal is an output pulse the width of which is determined by the voltage level set by said manual operation means.

4. A recording apparatus according to claim 3, wherein said control means stores a plurality of predetermined relationships for setting the print pulse width based on the width of the output pulse.

5. A thermal printer according to claim 2, wherein said density varying means includes manual operation means for manually setting the voltage level of the print pulse.

6. A thermal printer according to claim 2, wherein said density varying means includes ambient temperature sensing means for setting the voltage level of the print pulse in response to changes in the ambient temperature.

* * * * *

UNITED STATES PATENT AND TRADEMARK OFFICE
CERTIFICATE OF CORRECTION

PATENT NO. : 4,719,473

DATED : January 12, 1988

INVENTOR(S) : YOSHIYUKI SHIMAMURA

It is certified that error appears in the above-identified patent and that said Letters Patent is hereby corrected as shown below:

AT [56] IN THE REFERENCES

U.S. Patents, "4,113,341 9/1978 Minona ..... 346/76 PH" should read --4,113,391 9/1978 Minowa ..... 346/76 PH--.

COLUMN 2

Line 44, "throough" should read --through--.

COLUMN 3

Line 31, "preset-resistance" should read --preset resistance--.
Line 35, "step 26," should read --step S26,--.
Line 67, "TOM" should read --ROM--.

COLUMN 4

Line 2, "cn" should read --can--.
Line 30, "therefor" should read --therefore--.
Line 59, "switcing" should read --switching--.

COLUMN 5

Line 21, "thermister" should read --thermiostor--.
Line 36, "step 121," should read --step S121,--.

COLUMN 7

Line 16, "arrow the, i.e., a" should read --arrow a, i.e., the--.

UNITED STATES PATENT AND TRADEMARK OFFICE

CERTIFICATE OF CORRECTION

PATENT NO. : 4,719,473

DATED : January 12, 1988

INVENTOR(S) : YOSHIYUKI SHIMAMURA

It is certified that error appears in the above-identified patent and that said Letters Patent is hereby corrected as shown below:

COLUMN 8

Line 14, "fo" should read --of--.

Signed and Sealed this

Second Day of August, 1988

Attest:

DONALD J. QUIGG

*Attesting Officer*

*Commissioner of Patents and Trademarks*